United States Patent
Knowlton et al.

(10) Patent No.: US 7,139,651 B2
(45) Date of Patent: Nov. 21, 2006

(54) MULTI-SOURCE POSITIONING SYSTEM FOR WORK MACHINES

(75) Inventors: Timothy J. Knowlton, Benson, AZ (US); Kenneth W. Gay, Tucson, AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 365 days.

(21) Appl. No.: 10/795,198

(22) Filed: Mar. 5, 2004

(65) Prior Publication Data

US 2005/0197755 A1    Sep. 8, 2005

(51) Int. Cl.
G06F 19/00 (2006.01)
(52) U.S. Cl. .............. 701/50; 701/4; 701/23; 701/45; 701/214
(58) Field of Classification Search ............ 701/4, 701/23, 45, 50, 211, 213, 214, 215, 216, 220, 701/225; 250/340, 342
See application file for complete search history.

(56) References Cited

U.S. PATENT DOCUMENTS

| | | | |
|---|---|---|---|
| 5,438,771 A | 8/1995 | Sahm et al. | |
| 5,850,352 A * | 12/1998 | Moezzi et al. | 345/419 |
| 6,066,850 A * | 5/2000 | Hersom et al. | 250/342 |
| 6,191,732 B1 | 2/2001 | Carlson et al. | |
| 6,191,733 B1 | 2/2001 | Dizchavez | |
| 6,205,400 B1 * | 3/2001 | Lin | 701/214 |
| 6,427,122 B1 * | 7/2002 | Lin | 701/214 |
| 6,516,272 B1 * | 2/2003 | Lin | 701/214 |
| 2002/0116126 A1 * | 8/2002 | Lin | 701/214 |
| 2005/0131607 A1 * | 6/2005 | Breed | 701/45 |
| 2005/0248136 A1 * | 11/2005 | Breed et al. | 280/735 |

OTHER PUBLICATIONS

Egziabher et al., A gyro-free quatemion-based attitude determination system suitable for implementation using low cost sensors, 2000, IEEE, Mar. 13-16, 2000 pp. 185-192.*
L. Levy, "Innovation: The Kalman Filter: Navigation's Integration Workhorse," GPS World, vol. 8, No. 9, 1997.
L. Drolet et al., "Adaptable Sensor Fusion Using Multiple Kalman Filters", 2000 Proceedings IEEE/RSJ International Conference on Intelligent Robots and Systems, Japan.

* cited by examiner

Primary Examiner—Thomas Black
Assistant Examiner—McDieunel Marc
(74) Attorney, Agent, or Firm—Quarles & Brady Streich Lang, LLP

(57) ABSTRACT

A three-dimensional and a two-dimensional GPS unit periodically provide coordinate positions of points on the work machine and are combined with a Kalman filter to produce a point of reference on a work machine. The point of reference is improved by combining the position with an inertial position derived from accelerometer data in another Kalman filter. Additionally, the two-dimensional GPS unit provides a heading that is combined with an inertial orientation derived by the angular rate from a gyroscope in another Kalman filter to produce a precise orientation estimate. Inclinometers provide pitch and roll of the work machine. With the point of reference, orientation estimate, pitch, roll and known geometry of the work machine, the GPS unit calculates the location and orientation of machine components and continuously tracks its movement throughout the mine. Additionally, the accelerometers and gyroscope provide position and orientation when the GPS units are inoperable.

34 Claims, 6 Drawing Sheets

MULTI-SOURCE POSITIONING SYSTEM FOR WORK MACHINES

BACKGROUND OF THE INVENTION

1. Field of the Invention

The invention relates in general to the field of automated control of work equipment and, in particular, to a multiple-source system for determining the position and orientation of various components of a work machine operating on the grounds of a surface mine.

2. Description of the Related Art

Work machines play an integral part in mining operations and perform a variety of functions. They may excavate and transport ore, stabilize roads and slopes, and provide support functions. Most work machines, such as excavators, shovels, and backhoes, require human operators and move constantly. Their operation is time consuming and labor intensive because of the need for skilled drivers and a large crew to direct the work. For example, if a particular area of a mine needs to be excavated, the area is surveyed and marked before the machine operator can begin to remove the ore. During the process, the operator constantly updates the work machine's position and orientation to remove the ore efficiently. In addition, the work may only occur at certain times during the day to ensure the safety of the operator and the survey crew, especially if the mining conditions are not ideal.

Because of safety and efficiency concerns during mining, there has been much effort to develop automated systems of varying degrees, to control work machines. For example, a fully An automated machine can operate nonstop in a variety of conditions, without putting a human operator in danger. In addition, an automated system may eliminate the need for survey crews by identifying dig locations and automatically updating topographical changes for future work planning. In order for the automated system to be effective, it must account for the position and orientation of the work machine at all times. Various equipment-positioning systems have used a number of triangulation tools such as lasers, radio, microwave, radar, and satellite-based navigational systems, including the United States Global Positioning System (GPS) and the Russian Global Orbiting Navigational Satellite System (GLONASS) and other service components of the general Global Navigation Satellite System (GNSS). These services are generally referred to as "GPS".

Because fore-aft pitch and side-side roll can affect position and orientation values, some systems have utilized additional devices, such as inclinometers, rate gyros, magnetometers and accelerometers, to assist with equipment positioning.

U.S. Pat. No. 5,438,771 to Sahm et al. uses a single GPS unit to determine the location and orientation of a work machine with a rotatable car body. The system calls for GPS measurements at a known distance from the rotation axis and collects three coordinate positions as the car body rotates around a fixed undercarriage. The system then calculates the orientation plane of the car body and the position of the axis of rotation using the three sets of coordinates. With the calculated data and the known geometry of the work machine, the system can determine the position and orientation of critical machine components.

One problem of the system is that it can only be used with machines with a rotatable car body. In addition, the system can only calculate the orientation plane while the car body is rotating and the undercarriage is not moving. Therefore, if a machine moves to a new location, the system cannot unambiguously calculate the orientation until the undercarriage is motionless and the car body rotates. What is preferred is a system that can continuously track all types of work machines.

U.S. Pat. No. 6,191,732 to Carlson et al. comes close to describing a total picture of the work machine under all conditions by using a single GPS unit with additional devices to determine the position, pitch, roll, and orientation. The system obtains spatial coordinates from the GPS unit and uses inclinometers to measure the pitch and roll. To determine orientation, the system uses a magnetometer and a rate gyroscope to provide the current heading and the angular rate. The system needs an initial value, which the magnetometer usually provides, to use the rate gyro to calculate orientation. Thus, the Carlson approach determines orientation utilizing two position points, but it also relies on the initial orientation provided by the magnetometer. The rate gyro provides valid data, but magnetometers are unsuitable for mining operations due to electromagnetic interference from heavy equipment and mining deposits. Therefore, the system cannot determine an accurate orientation measurement during mining operations.

U.S. Pat. No. 6,191,733 to Dizchavez describes a system that can continuously track all types of work machines utilizing two high precision three-dimensional (3-D) GPS units. The GPS units periodically measure spatial coordinates with respect to a chosen reference. After obtaining two sets of measurements, the system calculates a plane equation fitting the two sets of data and determines the orientation, pitch, and roll of the work machine. With the calculated data and the known geometry of the work machine, the system can determine the position and orientation of critical machine components. One drawback of the system is that it requires valid GPS data from two sources. Thus, if GPS data are not available or unreliable and the work machine moves, the system cannot unambiguously determine the position and orientation until GPS data become available and the machine moves again. What would be preferred is a system that can function with a single 3-D 3-dimensional GPS unit and can compensate for GPS dropouts.

For the foregoing reasons, there is still a need for an improved method of determining location and orientation of a work machine during mining operations. This invention utilizes a novel combination of positioning components and data filtering to achieve these objectives.

SUMMARY OF INVENTION

The primary objective of this invention is a method and apparatus for determining the position and orientation of critical components of a work machine during mining operations.

Another important goal is a system that operates with a variety of work machines and is not limited to those with a rotatable car body.

Another objective of the invention is to constantly track position and orientation in a work machine regardless of whether the machine is moving or not.

Another important objective of the system is to provide position and orientation information of the work machine when GPS data are unavailable or unreliable.

Another goal of the system is to provide immunity to sensor fault conditions.

The preferred embodiment is an equipment-positioning system that uses a three-dimensional GPS unit to provide the spatial coordinate position of a point on the work machine with respect to a known reference. A two-dimensional GPS unit provides additional data (so called "heading only" unit in the art) measuring heading and a planar-coordinate position of a point on the work machine. An inclinometer is used to measure fore-aft pitch and side-side roll. The heading, planar-coordinate position, pitch and roll are all measured with respect to a known reference. With the measured data and the known geometry of the work machine, the system can then calculate the position and orientation of critical machine components.

It is known in the art that inertial sensors can be used in combination with a Kalman filter to remove noise associated with GPS measurements (both two-dimensional and three-dimensional). The Kalman filter is a data-fusion device that removes noise from linear systems. As such, it can improve the estimate of states, such as position and orientation, produced by a system with noisy outputs. Thus, using the combined outputs of GPS data and inertial-sensor data, the Kalman filter produces refined estimates of current position and orientation. Since the filter is a recursive algorithm, over time the estimated values become more precise. The process of fusion of inertial and GPS data in a Kalman filter is well understood in the art as illustrated, for example, in L. Levy, "Innovation: The Kalman Filter: Navigation's Integration Workhorse," GPS World, Vol. 8, No. 9, 1997.

The preferred embodiment of the present invention uses Kalman filtering or other data-fusion methods in a similar manner to improve position and orientation values. Rather than data from an inertial system, the invention uses a Kalman filter to combine the position outputs of a three-dimensional GPS unit and a two-dimensional GPS unit operating simultaneously. As a result, the system provides an estimate of GPS position with the 3-D GPS noise substantially removed.

To reduce the system's reliance on valid GPS data (both two and three-dimensional), inertial sensors provide an additional source of position and orientation information. Accelerometers measure linear accelerations along the horizontal plane and rate gyroscopes measure an angular rate of rotation. The system uses the measurements and a previous value to calculate an inertial position and an inertial orientation of the machine.

According to another aspect of the invention, the system incorporates another level of Kalman filtering to improve the estimated GPS position. By combining the estimated GPS position with a calculated inertial position in a Kalman filter, the system removes GPS noise. The result is a "noiseless" point of reference the system uses to calculate the position of various components of the work machine.

In the same manner, the system uses a third Kalman filter to produce an improved orientation estimate. The heading from the two-dimensional GPS unit is combined with a calculated inertial orientation in a Kalman filter, thus removing the GPS noise from the GPS heading. The output is an orientation estimate, preferably in the direction of the work instrument, that the system uses to determine the orientation of other components of the work machine.

The preferred embodiment also includes other features and advantages that will become apparent from a more detailed study of the drawings and description.

DETAILED DESCRIPTION

The present invention consists of an equipment-positioning system and a corresponding algorithm to calculate the position and orientation of a mining vehicle at a work site under variable data-communication conditions. The preferred embodiment is shown with reference to a specific type of work machine, but it is understood that the system applies to a variety of work machines, including but not limited to excavators, shovels, backhoes, and dump trucks and other types of heavy equipment found in mining operations.

Figure 1:
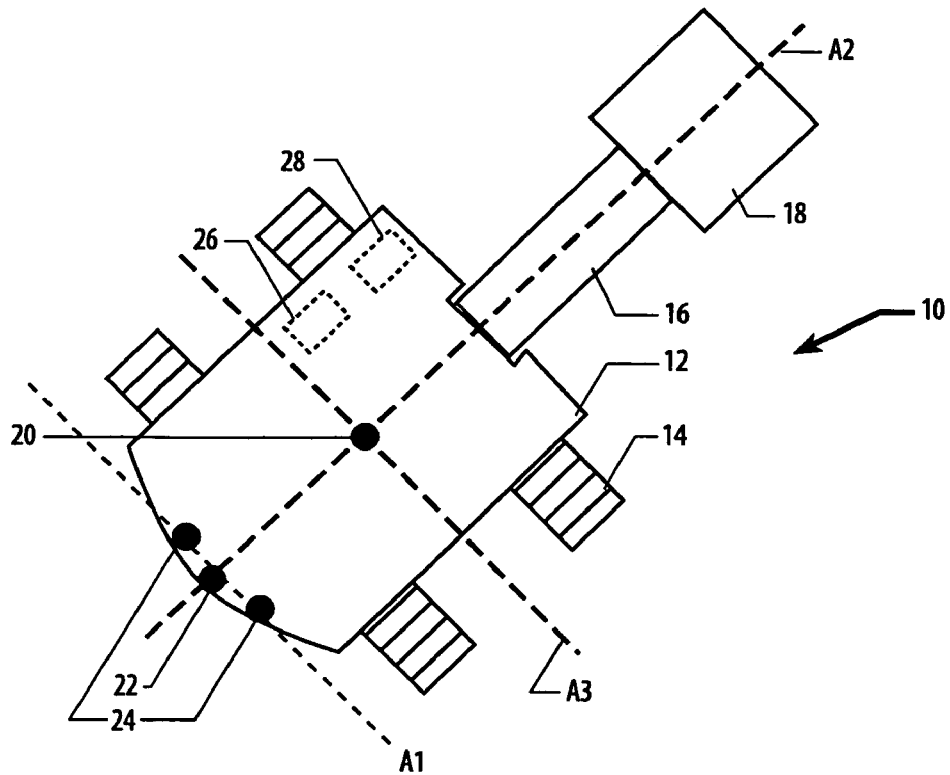
FIG. 1 is a schematic plan view of a conventional excavator illustrating the placement of GPS antennas and the inertial sensors according to the invention.

FIG. 1 illustrates a rotatable shovel-type work machine 10 used for mining operations incorporating the preferred embodiment of the invention. The machine consists of a rotating car body 12 mounted on an undercarriage 14 that moves the machine within the work site. Extending from the car body 12 is an articulated boom 16 with a shovel bucket 18. During machine utilization, the car body 12 spins around the axis of rotation 20 and moves the boom 16 and shovel bucket 18 to remove soil. In addition, the undercarriage 14 can either be stationary, tramming linearly, or moving around the axis of rotation 20.

Also shown in FIG. 1 is a single GPS antenna 22 located at a known distance from the axis of rotation 20 and connected to a 3-D GPS unit (not seen in FIG. 1) typically located within the car body. The GPS unit provides a spatial coordinate position for the antenna location and can be placed at any convenient location within the car body that does not interfere with its operation. The system uses spatial coordinates to determine a point of reference on the car body, preferably at the axis of rotation 20, from which to resolve the position of critical components, such as the boom 16 or shovel bucket 18. An example of a 3-D GPS unit available commercially is the high precision Real-Time Kinematic (RTK) GPS marketed by TOPCON Positioning Systems under the mark EURO-160. This type of high-precision GPS unit requires five satellites to receive a precise reading and provides accuracy down to 10 cm with an update rate up to 20 Hz.

As seen in FIG. 1, the invention also utilizes two additional GPS antennas 24 placed on the car body a known distance from the axis of rotation 20 and a known distance from each other. The antennas 24 are positioned preferably along an axis A1 perpendicular to the main axis A2 of the car body 12 and boom 16 and are connected to a less expensive, two-dimensional (so called "heading only") GPS unit located within the car body (not seen in FIG. 1). This GPS unit measures a heading along the axis A1 of the two antennas and a two-dimensional (planar) coordinate position at the location of a defined primary antenna, which can be either of the two antennas. Both readings are measured with respect to a known reference.

The preferred embodiment of the invention uses the heading provided by the two-dimensional GPS unit to determine an orientation, preferably the direction of the boom, from which to resolve the orientation of various other components. If the antennas 22,24 are placed along a different axis than the orientation of reference, as seen in FIG. 1, the system must account for the deviation.

The planar coordinates from the two-dimensional GPS unit serve a dual purpose. The 2-D position measurements are less accurate than those obtained from the 3-D unit, but fewer satellites are required to obtain a reading. Accordingly, although less precise, the system utilizes such 2-D GPS data to remove noise from the 3-D GPS measurements and to provide guidance when less that five satellites are available (i.e., when the 3-D GPS unit is not fully functional). Using the characteristics of each GPS unit results in increased accuracy in the GPS position value, and the system is able to operate more efficiently in less than ideal conditions.

Thus, according to one aspect of the invention, the planar coordinates (2-D only) from both the 2-D and 3-D GPS units are combined in a Kalman filter to compute an estimate of GPS position. Because of its lower accuracy, the two-dimensional GPS is less susceptible to noise. Therefore, it can be used advantageously to remove noise from the 2-D spatial coordinate measurement provided by the 3-D unit. By combining the two measurements in a Kalman filter, the negative traits of each measurement are reduced. As would be obvious to one skilled in the art, because the 2-D antennas may be at a different location than the 3-D antenna, the distance and orientation between the two need to be considered when calculating the estimated GPS position.

Figure 2:
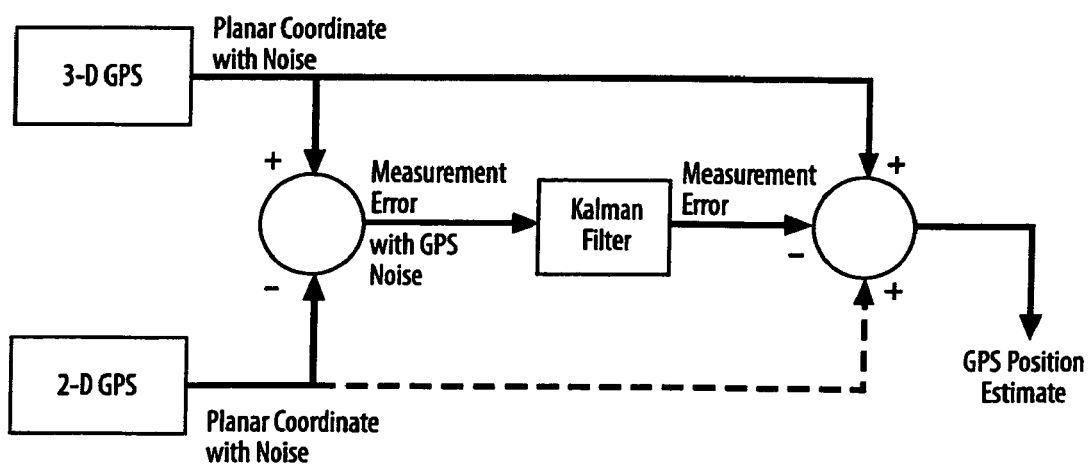
FIG. 2 shows a flow diagram detailing the utilization of the Kalman filter with two-dimensional and three-dimensional GPS data.

FIG. 2 illustrates how a Kalman filter is used in the invention to provide an improved GPS position. As stated before, the Kalman filter is a recursive algorithm that removes noise from linear systems. Any other data fusion method, including but not limited to Extended Kalman filtering or Bayes filtering, that reduces noise from data measurements would also be acceptable, but the Kalman filter is preferred because of its successful usage in the art of navigational systems.

As illustrated in FIG. 2, the current planar coordinates are received from each GPS unit. The planar coordinates from the 3-D GPS unit are the measured spatial coordinates with the elevation (i.e., z-coordinate) removed. As stated before, the planar coordinates from the 2-D GPS unit are measured with respect to the defined primary antenna. Next, the planar coordinates from the two GPS units are subtracted from each other, thereby removing the true position value and leaving only a measurement error value with GPS noise. Before subtracting the two readings, the system takes into account the distance and orientation between the respective antenna locations. The measurement error is then entered in a Kalman filter, which reduces the GPS noise, leaving only an estimate of the measurement error. Some GPS noise will still exist in the estimate because both readings are from GPS units, but the noise is drastically reduced by the filter. Finally, the system subtracts the measurement error from the 3-D GPS position to produce an improved GPS position estimate. For GPS units that provide a quality metric (a measurement that reflects the reliability of the incoming data), the system compares the quality metrics from each GPS reading and subtracts the measurement error from the more reliable value.

Besides noise filtering, the system uses the 2-D GPS unit to obtain a position of the machine when 3-D GPS measurements are unavailable or unreliable for any reason. As stated before, the 2-D GPS unit requires fewer satellites to provide a measurement than the 3-D unit; therefore, it may remain operational when the 3-D GPS unit is not. Whether the point on the machine is an estimated GPS position or from the 2-D GPS unit, the invention uses its value to calculate a point of reference on the machine from which the position of critical components is determined.

An example of such a "heading only" GPS unit available in commerce is CSI Wireless's product sold under the trademark VECTOR SENSOR. The unit requires three GPS satellites to provide a position reading and 0.5 degrees of heading accuracy when the antennas are at least 0.5-m apart with an update rate of 10 Hz. For 2-D position, the unit gives submeter accuracy, which is sufficient in most instances to continue operation when 3-D GPS data are not available, with an update rate of 5 Hz. Other available commercial "heading only" units are the JNSGYRO-2 from Javad Navigation Systems and the NAVISTAR from Northrop Grumman Sperry Marine.

Clearly, all GPS antennas and units must be placed in locations that ensure their functionality and protection from the harsh conditions of a mining operation. The system utilizes the United States Global Positioning System (GPS), but it is understood that any technology capable of determining the three-dimensional position and heading of a selected point on the vehicle with respect to a chosen reference could be used equivalently for the invention. Such positioning systems include the Russian Global Orbiting Navigational Satellite System (GLONASS) and other service components of the Global Navigation Satellite System (GNSS).

Referring back to FIG. 1, the apparatus of invention also includes inclinometers 26 to measure fore-aft pitch and side-side roll of the work machine 10. As understood in the art, fore-aft pitch and side-side roll are angular deviations with respect to perpendicular axes on the horizontal plane. The tilt along the axis A3 across the car body 12 of the work machine is normally referred to as the pitch, while the tilt along the axis A2 oriented along the car body 12, boom 16 and shovel bucket 18 is the roll. The inclinometers 26 are also located at a convenient location within the car body that does not interfere with their functionality.

With the data provided by the 2-D and 3-D GPS units, the inclinometers and the known geometry of the work machine, a data processing system 28 can compute the position and orientation of the machine and of any critical component thereof by simple geometrical calculations. Consequently, the preferred embodiment is capable of controlling and monitoring a working machine effectively.

According to another aspect of the invention, inertial sensors are also utilized to compensate for GPS dropouts and to increase data accuracy. Such inertial sensors provide another source of position and orientation data and can independently track the work machine. The system preferably uses a gyroscope, which measures angular rate, to compute orientation and uses accelerometers, which measure linear accelerations, to compute position.

Figure 3:
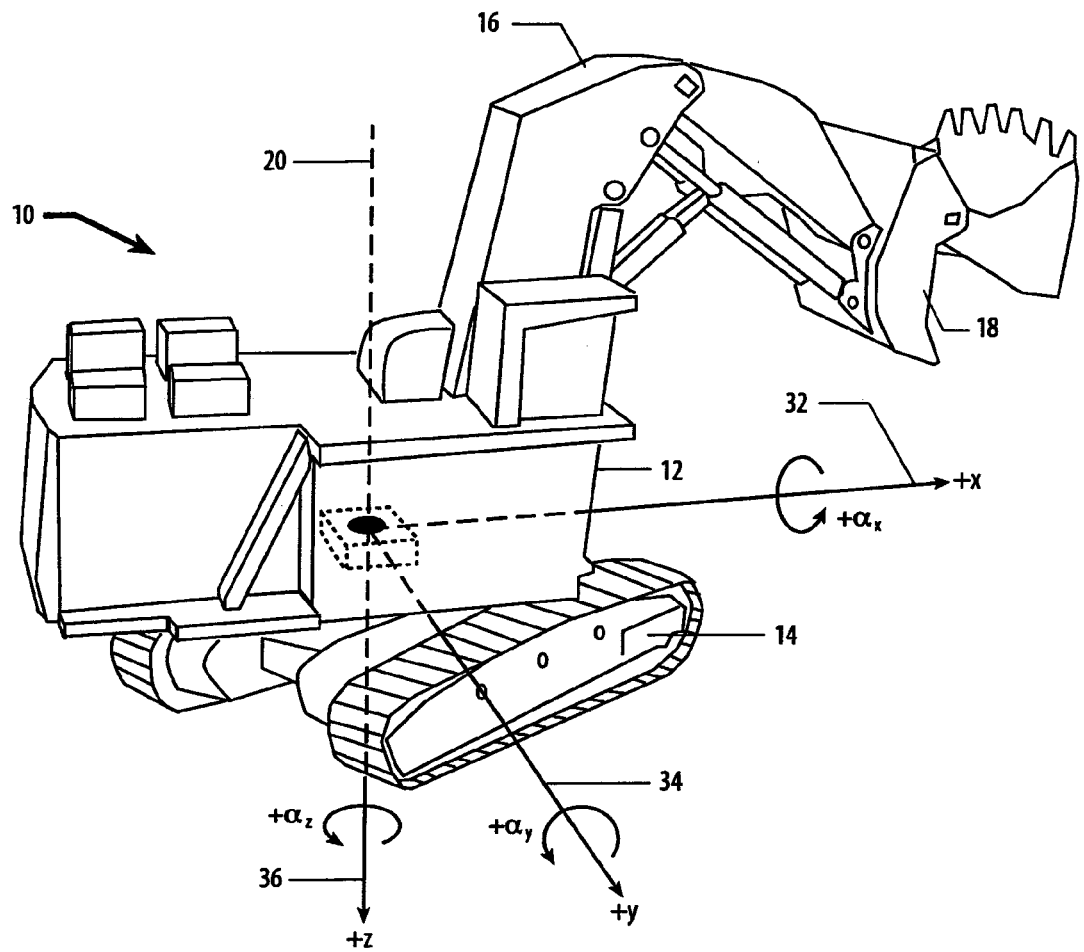
FIG. 3 is a perspective view of a conventional excavator illustrating the orientation of the linear and angular accelerations with respect to the car body when inertial devices are placed at the axis of rotation.

As illustrated in FIG. 3, wherein elements like those found in FIG. 1 are denoted with like numbers, inertial sensors 30 are located preferably along the center of rotation 20 of the car body 12 to minimize errors due to rotational accelerations. If they are not located at the center of rotation 20, any rotation of the car body affects the linear acceleration measurements and additional mathematical calculations are necessary to compensate for the errors. If mathematical calculations are inadequate, additional sensors such as inclinometers and gyroscopes are then used for compensation.

FIG. 3 also illustrates preferred orientation axes of a gyroscope and accelerometers with respect to the car body 12 and preferred definition of positive motion along each axis. The axes are configured perpendicular to each other with the x- and y-axes 32,34 on a horizontal plane and the z-axis 36 extending vertically.

Accordingly, the x-axis 32 extends through the front and the back of the car body 12 with a positive direction pointing toward the boom 16 and shovel bucket 18. The y-axis 34 extends through each side of the car body 12 with a positive direction pointing toward the right side. The z-axis 36 is the same as the axis of rotation 20 with a positive direction pointing downward through the bottom of the car body 12 with a clockwise positive rotation as defined by the right-hand rule. The right-hand rule states that, when the thumb is pointed in the positive axis direction, the curls of fingers point toward the direction of positive rotation.

The invention uses this configuration to define the rotation of the machine 10 around the z-axis 36 and the linear movement along the xy-plane. Additionally, the configuration allows the calculation of pitch and roll from acceleration measurements along the x- and y-axes using basic mathematical principles, if desired.

An example of a standalone inertial sensor found in commerce is the product "RGA300CA" from Crossbow Technology. The unit includes a triaxial accelerometer with the same orientation shown in FIG. 3 and a single axis gyroscope along the z-axis, and measures pitch and roll in static conditions. The unit provides data in a polled mode or continuously at a fixed rate of more than 100 Hz.

As stated before, the preferred embodiment utilizes inertial sensors in combination with the GPS units to increase data accuracy. The GPS units give accurate data with noise that varies due to external factors, and the inertial sensors provide a relatively noiseless output that will drift over time. By combining the two measurements in a Kalman filter, the negative traits of each measurement are reduced. The invention's use of the Kalman filter with inertial sensors and GPS measurements is similar to the process described previously with the 2-D and 3-D GPS units.

Figure 4:
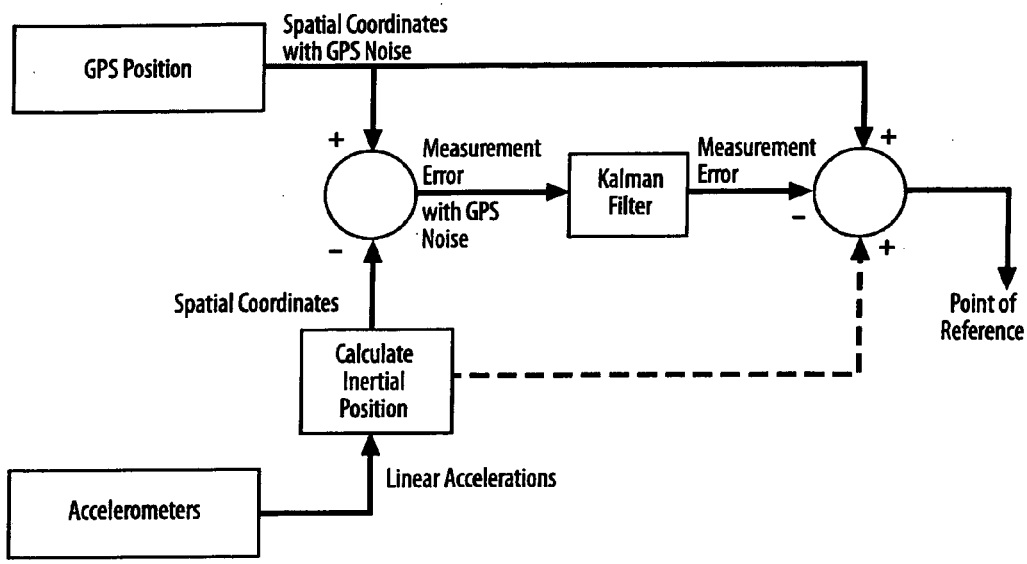
FIG. 4 shows a flow diagram detailing the utilization of the Kalman filter with GPS position data and accelerometer data.

FIG. 4 illustrates the use of a Kalman filter with a GPS position, preferably calculated using 2-D and 3-D GPS data in the manner described above, and data from accelerometers. First, as known in the art, the system computes an inertial position from a previous position and the current linear accelerations produced by the accelerometers. The previous position is preferably from an estimated value calculated using the data fusion method of FIG. 1, but it can also be obtained directly from the 3-D GPS unit, or computed from previous accelerometer measurements.

Next, the system subtracts the inertial spatial coordinates, from the GPS spatial coordinates, thus removing the true position value from each and leaving only measurement error. The error is a combination of residual GPS noise and inertial error. Next, the measurement error is entered into a Kalman filter, which further reduces GPS noise, leaving only an estimate of the measurement error. Because of the recursiveness of the Kalman filter, more GPS noise is effectively removed after each iteration. The measurement error is then subtracted from the GPS position producing a precise point of reference on the car body. If the GPS units provide a quality metric and it is not acceptable, the system instead subtracts the estimated measurement error from the inertial position to produce the point of reference.

In instances when the 3-D GPS position is not available, the system uses the 2-D GPS data, if available, as the GPS position. The planar coordinates of the 2-D GPS unit are combined with the corresponding planar coordinates of the inertial position (i.e., the spatial coordinates with the elevation removed), to produce the point of reference.

Figure 5:
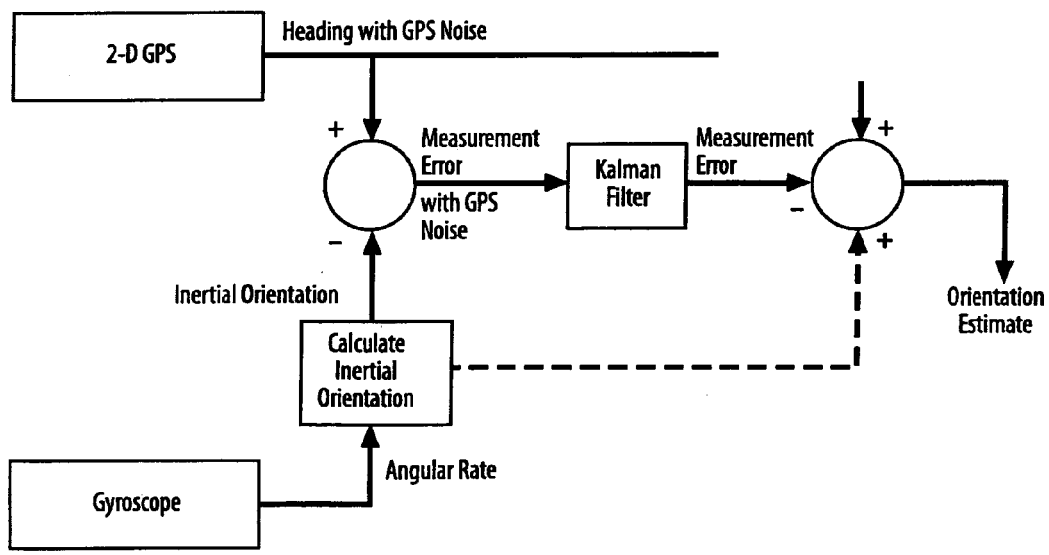
FIG. 5 shows a flow diagram detailing the utilization of the Kalman filter with GPS heading data and gyroscope data.

According to yet another aspect of the invention, the preferred embodiment in a similar manner calculates a precise orientation estimate using an inertial device, a GPS reading and a Kalman filter. FIG. 5 illustrates the use of a Kalman filter with a heading received from the 2-D GPS unit and an inertial orientation calculated from gyroscope measurements. First, the system uses the angular rate at the axis of rotation from the gyroscope to determine the current inertial orientation, preferably that of the work instrument. As known in the art, the system computes an inertial orientation from a previous orientation and the current angular rate measured by the gyroscope. The previous orientation is preferably from an estimated value calculated using a data fusion method, but it can also be obtained directly from the 2-D GPS unit or computed from previous gyroscope measurements. If the GPS heading is measured from a different reference on the car body than that of the inertial orientation, adjustments are made to resolve the differences.

Next, the system subtracts the inertial orientation from the GPS heading, thus removing the true orientation value from each and leaving only measurement error. As stated before, the error is a combination of GPS noise and inertial error. Next, the measurement error is inputted into the Kalman filter, which removes the GPS noise and leaves only an estimate of the measurement error. The measurement error is then subtracted from the GPS heading, producing a precise orientation estimate from which the system determines the orientation of various components of the work machine. If the GPS units provide a quality metric and the metric is not acceptable, the system instead subtracts the estimated measurement error from the inertial orientation to produce the orientation estimate.

Figure 6A:
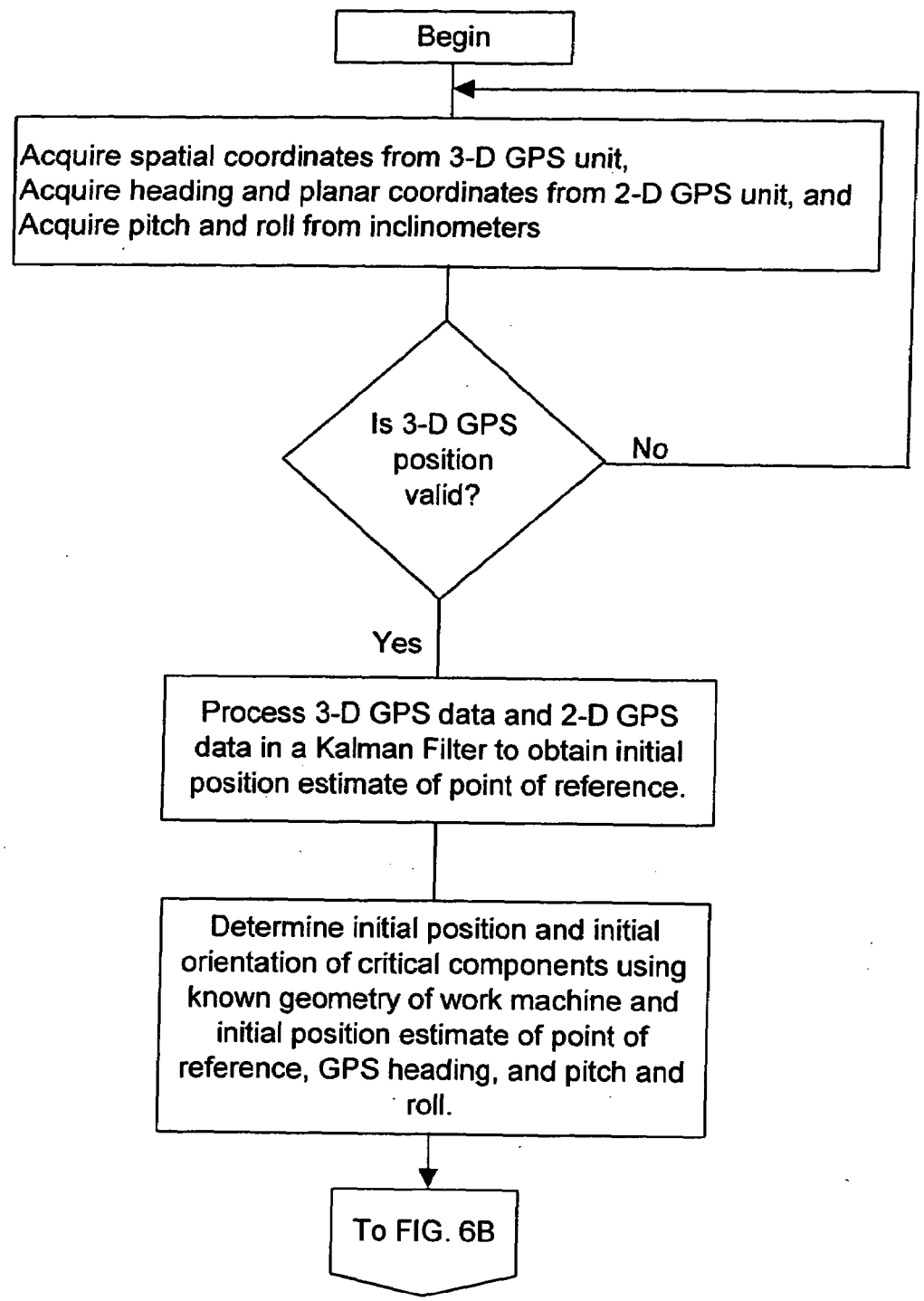
FIGS. 6a and 6b show a flow diagram detailing the computational steps of the invention determining the position, orientation, pitch, and roll of the work machine.
Figure 6B:
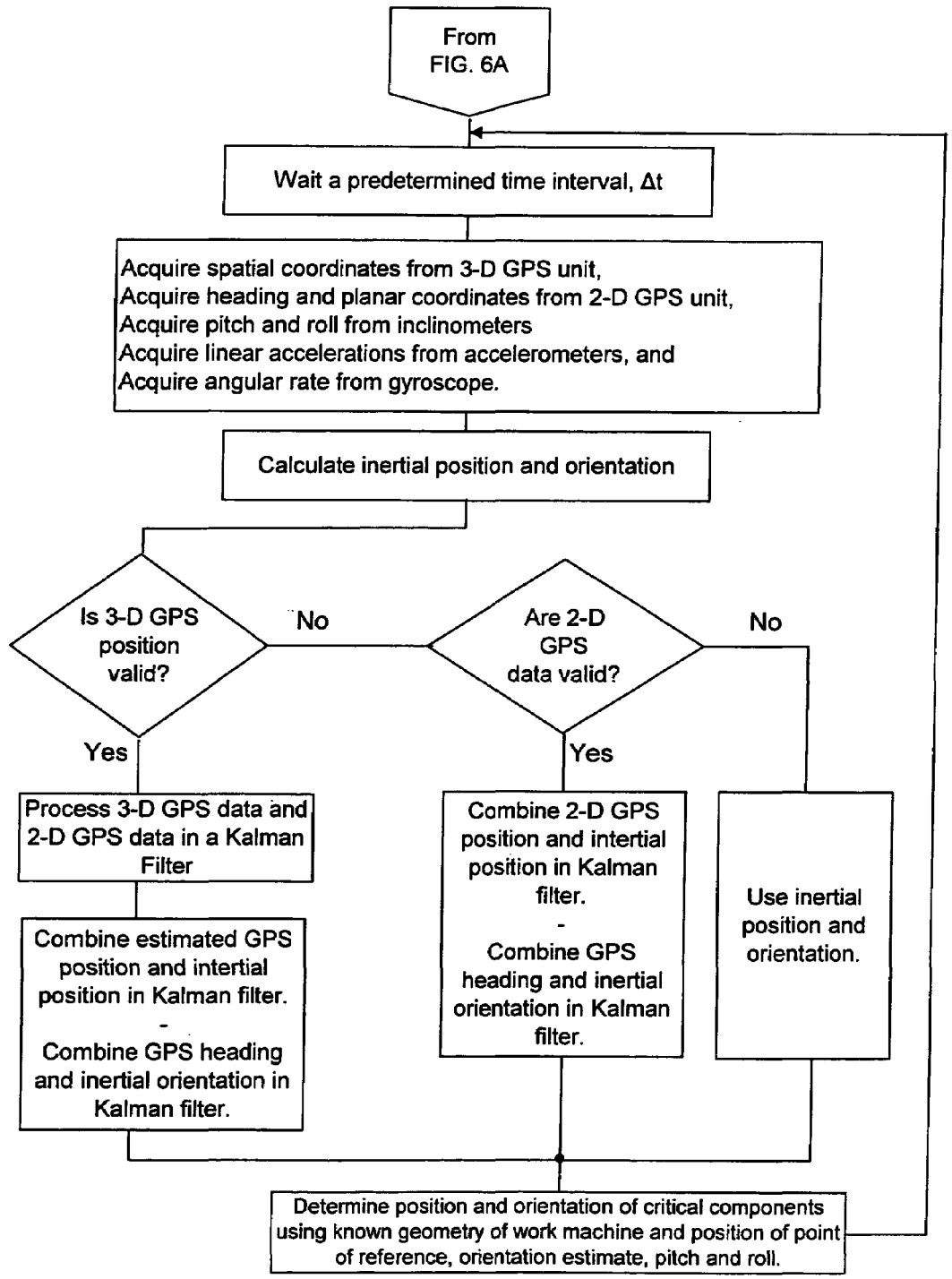

FIGS. 6a and 6b illustrate the computational steps of the preferred embodiment of the invention. FIG. 6a shows the initial processing of the invention and FIG. 6b shows the iterative steps while the invention controls and monitors a work machine. Referring to FIG. 6a first, the system reads data from both GPS units and the inclinometers. The three-dimensional GPS unit provides spatial coordinates of a point on the car body. The two-dimensional GPS unit provides planar coordinates for an additional point on the car body and a heading with respect to a known reference. In addition, the inclinometers provide pitch and roll of the car body. The data readings from each device must be synchronized in such a manner as to ensure accurate position and orientation values. The generally available 1PPS (one-pulse per second) output signal from either GPS unit, if provided, could be used to synchronize the data readings.

Next, the system checks whether the spatial coordinates from the 3-D GPS unit are valid. If so, the system produces an estimated GPS position with the spatial and planar coordinates combined with a Kalman filter as described previously in FIG. 2. With the estimated GPS position, GPS heading, pitch and roll, and the known geometry of the work machine, the system can compute the position and orientation of critical components. In addition, the system has an initial position and orientation to calculate inertial position and orientation values using the inertial sensor data.

However, if data from the three-dimensional GPS unit are unavailable, the process starts over. In order to start providing data when GPS units are inoperable, the inertial sensors require an initial position and orientation. Furthermore, because the system requires an elevation (a z-coordinate value) as part of the initial position, the planar coordinates from the 2-D GPS unit are insufficient by themselves.

FIG. 6b describes the iterative steps followed by the method of the invention after completion of the initial processing. First, the system waits a specific time interval, $\Delta t$, before continuing processing. The time interval is dependent on the specific application of the equipment-positioning system, update rates of the measurement devices, data synchronization, and other factors, as would be obvious to those of ordinary skill in the art.

After the delay, the system measures the readings from the different devices: spatial coordinates from the 3-D GPS unit, heading and planar coordinates from the 2-D GPS unit, pitch and roll from the inclinometers, current angular rate from the gyroscope and current linear accelerations from the accelerometers. As stated before, the readings from all devices are synchronized in such a manner to ensure accuracy. After receiving the measurements from the different devices, the system calculates a current inertial position and orientation from the current linear accelerations and angular rate.

Next, the system must determine which GPS values are valid. First, the system checks the validity of the 3-D GPS position. If the spatial coordinates are valid, the system combines them with the planar coordinates of a 2-D GPS unit in a Kalman filter to produce an estimated GPS position, as described previously in FIG. 2. Next, the invention combines the GPS measurements with the inertial data in another step of Kalman filter processing to produce precise position and orientation estimates. Thus, the system combines the best estimate of GPS position with the calculated inertial position to produce a point of reference on the car body. Furthermore, the system produces a precise orientation estimate by combining the GPS heading and the calculated inertial orientation in a Kalman filter. Each process was described previously in more detail in FIGS. 4 and 5.

However, if the spatial coordinates from the 3-D GPS unit are not valid, the system checks the validity of the GPS heading and planar coordinate from the 2-D unit. If so, the system combines the planar coordinates with the inertial position in a Kalman filter to produce a point of reference on the car body. In addition, in the same manner described before, the system combines the GPS heading and the inertial orientation in a Kalman filter to produce a precise orientation estimate. If both the 2-D and 3-D GPS units are inoperable, no Kalman filtering takes place and the system uses the inertial position and orientation as the point of reference and orientation estimate.

Thus, with a point of reference, orientation estimate, pitch, roll, and known geometry of the work machine, the system can calculate the position and orientation of critical components under various conditions of data availability. During the continued operation of the system, the iterative process repeats itself, constantly updating the position and orientation of the work machine. Furthermore, the Kalman filter removes more GPS noise from position and orientation measurements with each iteration.

An alternative embodiment of the invention uses a different data fusion method. One weakness of using a Kalman filter is that it models a specific system. If the system were to change by adding a sensor or the failure of an existing sensor, the model would no longer be valid. One approach to solving this problem is to use multiple banks of Kalman filters associated with various sensors and automatically select a configuration that matches the actual sensor conditions. This data fusion method is referred to as "Adaptive Sensor Fusion". It monitors the sensor conditions and changes its operation accordingly without intervention. Adaptive Sensor Fusion is well known in the art as illustrated, for example, in L. Drolet, F. Michaud, J. Cote, "Adaptable Sensor Fusion Using Multiple Kalman Filters", 2000 Proceedings IEEE/RSJ International Conference on Intelligent Robots and Systems (IROS), Takamatsu, Japan.

Figure 7:
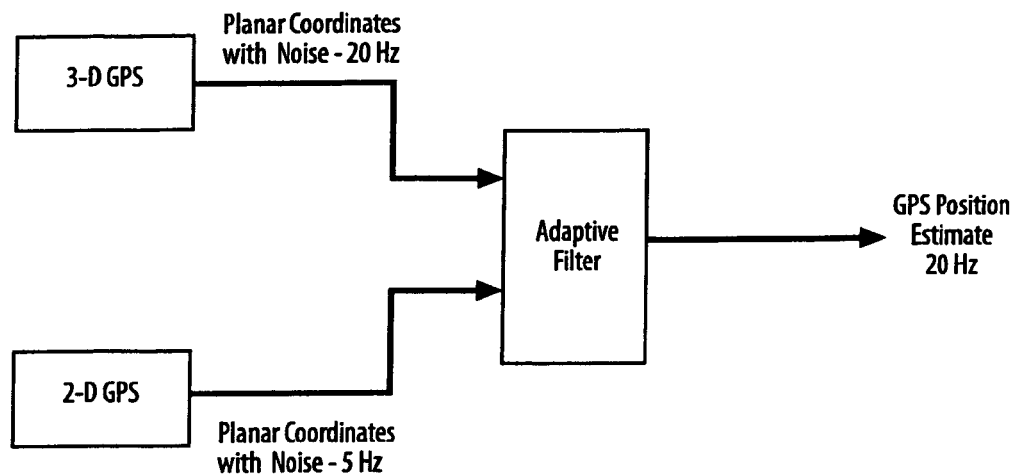
FIG. 7 shows a flow diagram detailing the utilization of the Adaptive Sensor Fusion filter with two-dimensional and three-dimensional GPS data with different input frequencies.

One benefit of Adaptive Sensor Fusion filtering is its use with asynchronous inputs. As discussed before, the example hardware used by the preferred embodiment has different update rates. The 3-D GPS unit from TOPCON has an update rate of 20 Hz and the 2-D GPS unit from CSI Wireless has an update rate of 5 Hz. By replacing the Kalman filter with an Adaptive filter as shown in FIG. 7, the invention can use every reading from each device. The Adaptive filter would output the reading from the 3-D GPS unit when data from 2-D GPS unit is not available and then automatically combine the two inputs in a Kalman filter in the manner described in FIG. 2 when both data sources are available. The result is a 20 Hz. GPS estimate output from the Adaptive filter compared to a 5 Hz. output from a single Kalman filter.

Furthermore, the output of the Adaptive filter shown in FIG. 7 can be combined with the output of the inertial sensor in a similar manner. The inertial sensor from Crossbow Technology has an output rate of 100 Hz. With the inertial position calculated from the output of the accelerometers combined with the output of the first Adaptive filter in a second Adaptive filter, the alternative embodiment can provide an improved position estimate at a higher rate. In a similar manner, the heading from the 2-D GPS unit and the heading calculated from rate gyroscope readings can be combined in a third Adaptive filter to produced an improved orientation estimate. Thus, the Adaptive filter allows the alternative embodiment to update the position and orientation of critical components of the work machine at a faster rate.

Adaptive filtering is also beneficial with the use of multiple inputs. When the same value such as position is received from a number of sources, an Adaptive filter can combine the data from most reliable sources at a particular time interval to produce a refined output. For example, the GPS position estimate generated in FIG. 7 and the inertial position generated by accelerometer readings include x-axis, y-axis and z-axis components. The Adaptive filter can combine x-axis GPS component with the x-axis inertial component based on the x-axis accelerometer in one filter, and combine the y-axis GPS component with y-axis inertial component based on the y-axis accelerometer in another filter and do the same with the respective z-axis components. Thus, an alternative embodiment of the invention can generate an improved point of reference based on the most reliable data from the GPS units and each accelerometer reading individually.

Figure 8:
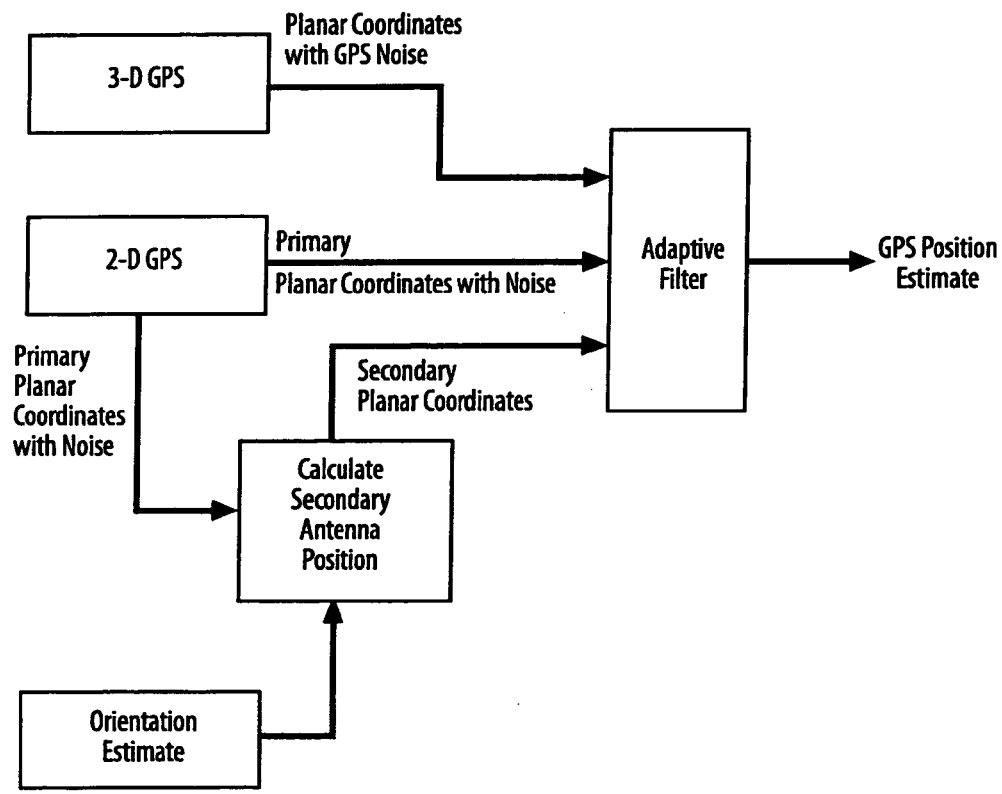
FIG. 8 shows a flow diagram detailing the utilization of the Adaptive Sensor Fusion filter with two-dimensional and three-dimensional GPS data, and an additional point on the work machine calculated using the orientation estimate generated from the output of FIG. 5.

Another alternative embodiment uses additional point on the work machine to help refine the estimated GPS position generated in FIG. 2. Using the known planar coordinates of the primary 2-D antenna from the 2-D GPS unit, the known distance between the two antenna and the orientation estimate calculated in FIG. 5, the invention calculates the planar coordinates of the secondary 2-D GPS antenna. By using the orientation estimate, the inertial error of the rate gyroscope can be included in the Adaptive filtering to improve the GPS position estimate especially in cases where the planar coordinates from the 3-D GPS unit are unavailable. The filtering inside the Adaptive filter would improve the estimate with each iteration. FIG. 8 illustrates this process.

Various changes in the details, steps and components that have been described may be made by those of ordinary skill in the art within the principles and scope of the invention herein illustrated and defined in the appended claims. Therefore, while the present invention has been shown and described herein in what is believed to be the most practical and preferred embodiments, it is recognized that departures can be made there from within the scope of the invention, which is not to be limited to the details disclosed herein but is to be accorded to the full scope of the claims so as to embrace any and all equivalent apparatus and processes.

We claim:

1. A method for determining a position and an orientation of a work machine having a known geometry comprising the following steps:
    (a) obtaining spatial coordinates of a point of reference on the work machine from a three-dimensional global positioning system unit;
    (b) obtaining planar coordinates of said point of reference on the work machine from a two-dimensional global positioning system unit;
    (c) processing the spatial coordinates and the planar coordinates from said global positioning system units in a first data fusion procedure to produce an improved position estimate of said point of reference;
    (d) obtaining an orientation of the work machine from the two-dimensional global positioning system unit;
    (e) obtaining pitch and roll of the work machine from an attitude sensor;
    (f) calculating a position and an orientation of critical work-machine components utilizing the improved position estimate of the point of reference, the orientation, the pitch, the roll and the known geometry of the work machine; and
    (g) repeating steps (a)–(f) at predetermined time intervals to update said position and orientation of the critical work-machine components.

2. The method of claim 1, wherein the first data fusion procedure of step (c) is performed with a Kalman filter.

3. The method of claim 1, wherein step (e) is carried out utilizing inclinometers.

4. The method of claim 1, wherein step (e) is carried out by the following steps:
    obtaining linear accelerations associated with the work machine from inertial sensors; and
    calculating said pitch and roll from the linear accelerations.

5. The method of claim 1, further including the following steps prior to step (d):
    obtaining linear accelerations associated with the work machine from inertial sensors;
    calculating an inertial spatial position of said point of reference from the linear accelerations; and
    processing the inertial spatial position and said improved position estimate from step (c) in a second data fusion procedure to produce a more improved position estimate.

6. The method of claim 5, wherein said first and second data fusion procedures are performed with Kalman filters.

7. The method of claim 5, wherein step (e) is carried out utilizing inclinometers.

8. The method of claim 5, wherein step (e) is carried out by calculating said pitch and roll from said linear accelerations associated with the work machine.

9. The method of claim 1, further including the following steps prior to step (e):
    obtaining an angular rate of rotation of the work machine from an inertial sensor;
    calculating an inertial orientation of the work machine from said angular rate of rotation; and
    processing said inertial orientation and the orientation from step (d) in a second data fusion procedure to produce an improved orientation estimate.

10. The method of claim 9, wherein said first and second data fusion procedures are performed with Kalman filters.

11. The method of claim 9, wherein step (e) is carried out utilizing inclinometers.

12. The method of claim 9, wherein step (e) is carried out by the following steps:
    obtaining linear accelerations associated with the work machine from inertial sensors; and
    calculating said pitch and roll from the linear accelerations.

13. The method of claim 5, further including the following steps:
    obtaining an angular rate of rotation of the work machine from an inertial sensor;
    calculating an inertial orientation of the work machine from said angular rate of rotation; and
    processing said inertial orientation and the orientation from step (d) in a third data fusion procedure to produce an improved orientation estimate.

14. The method of claim 13, wherein said first, second, and third data fusion procedures are performed Kalman filters.

15. The method of claim 13, wherein step (e) is carried out utilizing inclinometers.

16. The method of claim 13, wherein step (e) is carried out by calculating said pitch and roll from said linear accelerations associated with the work machine.

17. The method of claim 1 wherein step (c) is replaced by the following steps:
    verifying whether the spatial coordinates of the point of reference from said three-dimensional global positioning system unit of step (a) are at an acceptable reliability level, and when said spatial coordinates are not at an acceptable reliability level,
    obtaining linear accelerations associated with the work machine from inertial sensors;
    calculating an inertial spatial position of said point of reference from the linear accelerations; and
    processing the inertial spatial position and the planar coordinates from said two-dimensional global positioning system unit of step (b) in a first data fusion procedure to produce an improved position estimate of said point of reference.

18. The method of claim 17, wherein said first data fusion procedure is a Kalman filter.

19. The method of claim 17, wherein step (e) is carried out utilizing inclinometers.

20. The method of claim 17, wherein step (e) is carried out by calculating said pitch and roll from said linear accelerations associated with the work machine.

21. The method of claim 17 further including the following steps prior to step (e):
   obtaining an angular rate of rotation of the work machine from an inertial sensor;
   calculating an inertial orientation of the work machine from said angular rate of rotation; and
   processing said inertial orientation and the orientation from step (d) in a second data fusion procedure to produce an improved orientation estimate.

22. The method of claim 21, wherein said first and second data fusion procedures are performed by Kalman filters.

23. The method of claim 21, wherein step (e) is carried out utilizing inclinometers.

24. The method of claim 21, wherein step (e) is carried out by calculating said pitch and roll from said linear accelerations associated with the work machine.

25. The method of claim 1 wherein the following steps replace steps (c–f):
   verifying whether the spatial and planar coordinates of the point of reference from said three-dimensional and two-dimensional global positioning system units, respectively, are at acceptable reliability levels, and when said spatial coordinates and said planar coordinates are not at acceptable levels,
   obtaining linear accelerations associated with the work machine from an inertial sensor;
   calculating an inertial spatial position of point of reference from the linear accelerations;
   obtaining an angular rate of rotation of the work machine from inertial sensors;
   calculating an inertial orientation of the work machine from said angular rate of rotation;
   obtaining pitch and roll of the work machine from an attitude sensor; and
   calculating a position and an orientation of critical work-machine components utilizing the inertial spatial position of the point of reference, the inertial orientation, the pitch, the roll and the known geometry of the work machine.

26. The method of claim 25, wherein step (e) is carried out utilizing inclinometers.

27. The method of claim 25, wherein step (e) is carried out by calculating said pitch and roll from said linear accelerations associated with the work machine.

28. An apparatus for determining a position and an orientation of a work machine having a known geometry comprising:
   a three-dimensional global positioning system unit for obtaining spatial coordinates of a point of reference on the work machine;
   a two-dimensional global positioning system unit for obtaining planar coordinates of said point of reference on the work machine and for obtaining an orientation of the work machine;
   an attitude sensor for obtaining pitch and roll of the work machine;
   a first data fusion filter for producing an improved position estimate of said point of reference from the spatial coordinates and the planar coordinates; and
   a processing means for calculating a position and an orientation of critical work-machine components from the improved position estimate of the point of reference, and from the orientation, the pitch, the roll and the known geometry of the work machine;
   wherein said position and orientation of critical work-machine components are updated at predetermined time-intervals.

29. The apparatus of claim 28, further comprising:
   inertial sensors for obtaining linear accelerations associated with the work machine;
   means for calculating an inertial spatial position of said point of reference from the linear accelerations; and
   a second data fusion filter for producing a more improved position estimate from the inertial spatial position and said improved position estimate.

30. The apparatus of claim 28, further comprising:
   an inertial sensor for obtaining an angular rate of rotation of the work machine;
   means for calculating an inertial orientation of the work machine from said angular rate of rotation; and
   a second data fusion filter for producing an improved orientation estimate from the inertial orientation and the orientation from said two-dimensional global positioning system unit.

31. The apparatus of claim 29, further comprising:
   an inertial sensor for obtaining an angular rate of rotation of the work machine;
   means for calculating an inertial orientation of the work machine from said angular rate of rotation; and
   a third data fusion filter for producing an improved orientation estimate from the inertial orientation and the orientation from said two-dimensional global positioning system unit.

32. The apparatus of claim 28, further comprising:
   inertial sensors for obtaining linear accelerations associated with the work machine;
   means for calculating an inertial spatial position of said point of reference from the linear accelerations; and
   a second data fusion procedure for producing a more improved position estimate from the inertial spatial position and the planar coordinate from said two-dimensional global positioning system when the spatial coordinates of the point of reference from said three-dimensional global positioning system unit are not at an acceptable reliability level.

33. The apparatus of claim 32, further comprising:
   an inertial sensor for obtaining an angular rate of rotation of the work machine;
   means for calculating an inertial orientation of the work machine from said angular rate of rotation; and
   a third data fusion procedure for producing a best orientation estimate from the inertial orientation and the orientation from said two-dimensional global positioning system unit.

34. The apparatus of claim 28 further comprising:
   inertial sensors for obtaining linear accelerations associated with the work machine;
   an inertial sensor for obtaining an angular rate of rotation of the work machine;
   means for calculating an inertial spatial position of said point of reference from the linear accelerations; and
   means for calculating an inertial orientation of the work machine from said angular rate of rotation;
   wherein the inertial spatial position of the point of reference, and the inertial orientation, the pitch, the roll and the known geometry of the work machine are used to calculate a position and an orientation of critical work-machine components when the spatial and planar coordinates of the point of reference from said three-dimensional and two-dimensional global positioning system units, respectively, are not at acceptable reliability levels.

* * * * *